United States Patent [19]

Schwarz

[11] 3,808,511

[45] Apr. 30, 1974

[54] LOAD INSENSITIVE ELECTRICAL DEVICE

[75] Inventor: Francisc C. Schwarz, Weston, Mass.

[73] Assignee: The United States of America as represented by the Administrator of the National Aeronautics and Space Administration, Washington, D.C.

[22] Filed: Nov. 6, 1970

[21] Appl. No.: 87,597

Related U.S. Application Data

[62] Division of Ser. No. 810,579, March 26, 1969, Pat. No. 3,621,362.

[52] U.S. Cl............................................. 321/45 R
[51] Int. Cl........................................... H02m 7/00
[58] Field of Search................... 321/45 R; 331/117

[56] References Cited
UNITED STATES PATENTS

| | | | |
|---|---|---|---|
| 3,323,076 | 5/1967 | Pelly | 331/117 |
| 3,448,367 | 6/1969 | Corey | 321/45 R X |

Primary Examiner—William M. Shoop, Jr.
Attorney, Agent, or Firm—John R. Manning; N. T. Musical; J. A. Mackin

[57] ABSTRACT

A class of power converters is disclosed for supplying direct current at one voltage from a source at another voltage which includes a simple passive circuit arrangement of solid-state switches, inductors, and capacitors by which the output voltage of the converter tends to remain constant in spite of changes in load. The switches are sensitive to the current flowing in the circuit and are employed to permit the charging of capacitance devices in accordance with the load requirements. Because solid-state switches (such as SCR's) may be used with relatively high voltage and because of the inherent efficiency of the invention that permits relatively high switching frequencies, power supplies built in accordance with the invention, together with their associated cabling, can be substantially lighter in weight for a given output power level and efficiency of operation than systems of the prior art.

23 Claims, 11 Drawing Figures

LOAD INSENSITIVE ELECTRICAL DEVICE

STATEMENT OF COPENDENCY

This is a division of application Ser. No. 810,579 filed Mar. 26, 1969, now U.S. Pat. No. 3,621,362.

ORIGIN OF THE INVENTION

The invention described herein was made by an employee of the United States Government and may be manufactured and used for or by the Government for Governmental purposes without the payment of any royalties thereon and therefor.

BACKGROUND OF THE INVENTION

This invention relates to power supplies, and more particularly to power supplies of the kind known as DC to DC converters.

In the early days of the electrical industry it was common to convert alternating current to direct current by means of a resonant contactor tuned to interrupt the current at the instant of zero voltage. Tuning of the mechanical devices could not be perfect, and they were subsequently replaced by rectifiers which were not subject to wear but were substantially less than perfect switches. Now, solid-state switches approach the ideal in performance and there has been a rebirth of switching-type converters. A theoretically perfect switch dissipates no energy, so efficiencies approach 100 percent.

Moreover, switching schemes involving such techniques as pulse-frequency modulation and pulse-width modulation provide a measure of proportional control, while retaining the inherent high efficiency of the switching operation.

It is a common requirement that a power supply should maintain a constant output voltage. Devices, termed "voltage regulators" have been available which control a source or a flow of current to maintain a voltage constant across a load in spite of fluctuations in source potential or load current. These regulators provide control to any practical degree but at a cost in system complexity, reliability and efficiency.

Accordingly, it is an object of the present invention to improve power converters.

It is a further object of the present invention to improve the efficiency of power conversion systems.

It is a further object of the present invention to convert power at a first potential to a second (higher or lower) potential, the second potential being maintained substantially constant despite changes of current in a load.

It is another object of the present invention to provide a class of power converters for supplying direct current at one voltage from a source at another voltage which includes a simple passive circuit arrangement of solid-state switches, inductors and capacitors by which the output voltage of the converter tends to remain constant in spite of changes in load.

The use of the term "inductors" herein comprehends chokes, autotransformers, transformers of two or more windings and the like, as the use requires.

Because available solid-state switches as exemplified by so-called rectifiers and more specifically, Silicon Controlled Rectifiers (SCR's), may be used with relatively high voltages, and because of the inherent efficiency of the circuits employed that permit a relatively high switching frequency, power supplies built in accordance with the invention, together with their associated cabling can be substantially lighter in weight for a given output power level and a given efficiency of operation than systems constructed in accord with the prior art. Reduction in weight is particularly significant in systems intended for use in spacecraft, aircraft, hydrofoil and hovercraft, or man-carried equipment, and the like.

SUMMARY OF THE INVENTION

A feature by which the above-mentioned objects are attained is through an interconnection of series-resonant circuits each comprising inductances and capacitors in the paths of flow of load current and eventually a terminal capacitance across the load, the interconnection such that the connections between inductances and capacitances may be closed and opened by semiconductor switches.

Before considering the invention in detail, it may be well to consider the relationship between input voltage and output voltage which is presented for purposes of clarification:

$l_o = \eta \, r \, l_s$ where
$l_o$ = output voltage
$\eta$ = conversion efficiency
$r$ = scaling constant
$l_s$ = input voltage.

The scaling constant $r$ is determined to suit the specific objective. The arrangement of interconnections, as discussed further on, will be applied to achieve this purpose. The efficiency of conversion $0 < \eta < 1$ incorporates the departure from unity of power transfer, due to ohmic losses in the elements of power transfer and control.

With reference now to the present invention, the energy derived from an appropriate D.C. source is transferred along series and/or parallel paths or successive capacitors through successive resonant circuits in a succession of discrete current pulses. Each of these pulses is initiated by a timer circuit which causes the closing of the respective semiconductor switch, and terminated by the inherent inability of such a solid-state switch to admit a reverse current flow. The terminal capacitor and the smoothing inductor connected to it are the immediate source of current for the load. The charge on the terminal capacitor is replenished by a time-varying current through the inductor. When the preceding switch through the action of the timer circuit is closed to initiate an increase of inductor current, then the voltage on the next-preceding capacitor which feeds current to the smoothing inductor is at its lowest ebb. The heavier the load, the lower its voltage. Current surges into this capacitor in proportion to the difference between this voltage and the time-average potential of that capacitor. The lower the voltage drops, the greater the potential difference, and the greater the current. This current flowing in the surge which recharges this capacitor does not stop when it is recharged to source potential, but is then at its maximum strength and tends, by reason of the inductance to continue to flow through the switch and its associated inductor into the capacitor until the voltage crest is reached which exceeds the average potential by almost the same amount by which the average exceeded the capacitor potential when the surge commenced.

At this point, as the current falls to zero, the switch is opened to hold the peak potential on the terminal capacitor which then gives up its charge to the load as its potential falls. If the load is the same as in the previous cycle the average capacitor voltage will be substantially equal to the supply voltage. If the load increases so as to reduce the average capacitor voltage and the minimum voltage reached, during a particular cycle, the circuit automatically compensates by increasing the surge of current and the resulting peak capacitor voltage for the next cycle. This basic circuit arrangement may be used in conjunction with step-up and step-down transformers in capacitor-voltage-doubling circuits, capacitor-voltage multiplying circuits, and in other ways to realize the above objects.

The invention accordingly comprises the features of construction, combinations of elements, and arrangement of parts, which will be exemplified in the constructions hereinafter set forth, and the scope of the invention will be indicated in the claims.

BRIEF DESCRIPTION OF THE DRAWINGS

For a complete understanding of the nature and objects of the invention, reference should be had to the following detailed description taken in connection with the accompanying drawings, in which:

The FIG. 1 is a schematic diagram of a simple three-section embodiment of the invention;

Figure 1:
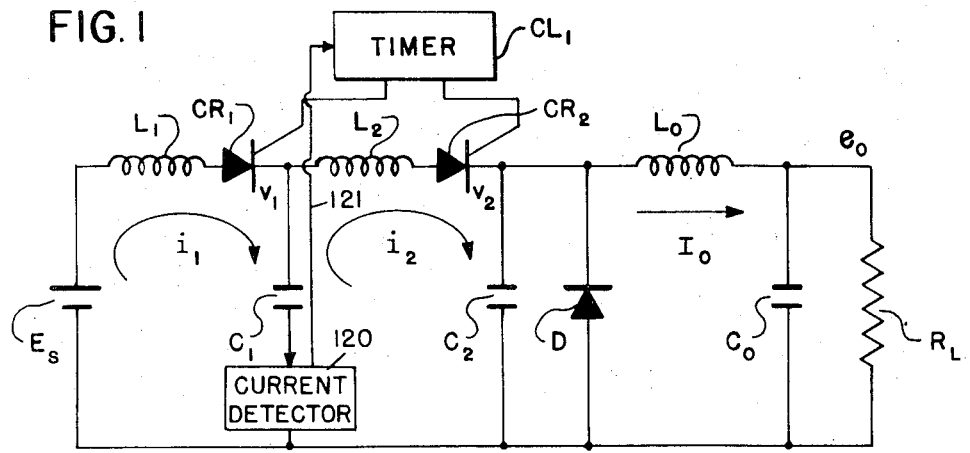
Figure 3:
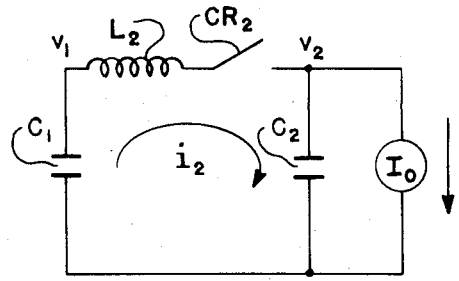
Figure 4:
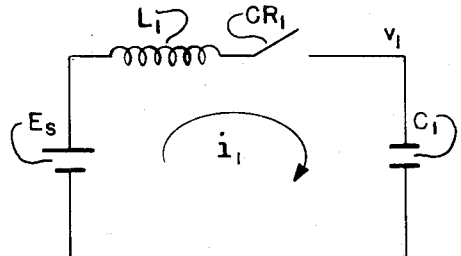
Figure 5:
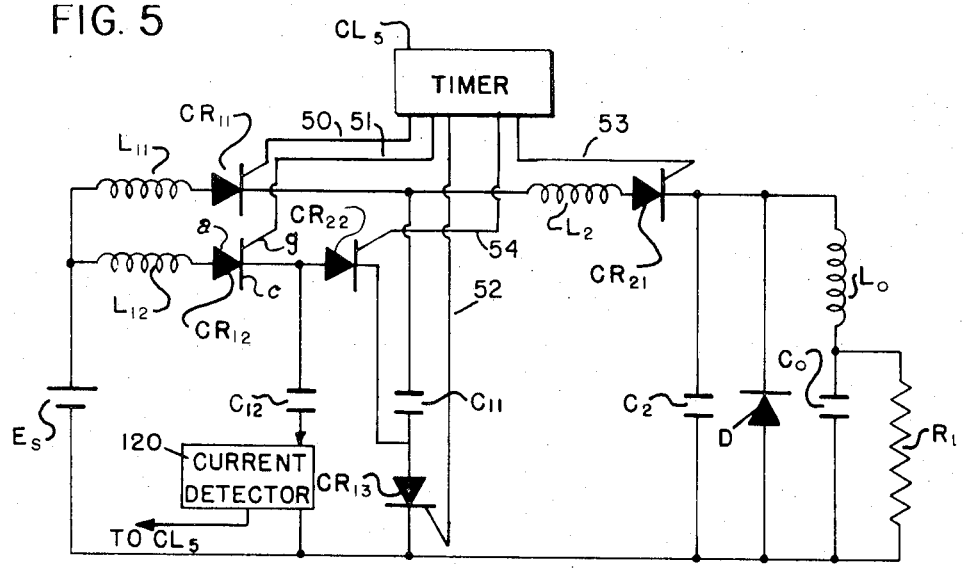
Figure 6:
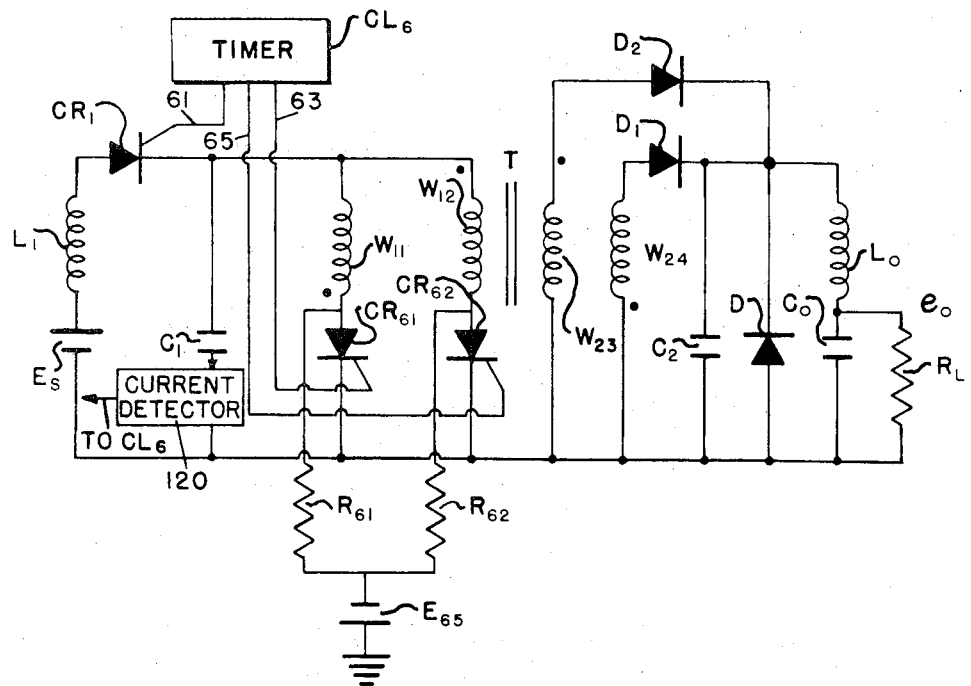
Figure 7:
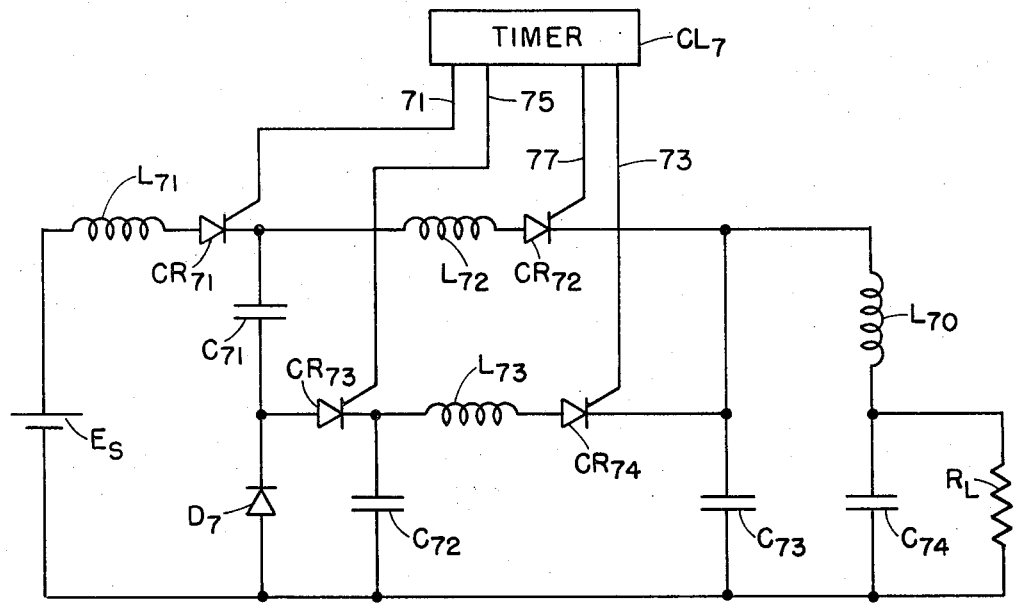
Figure 8:
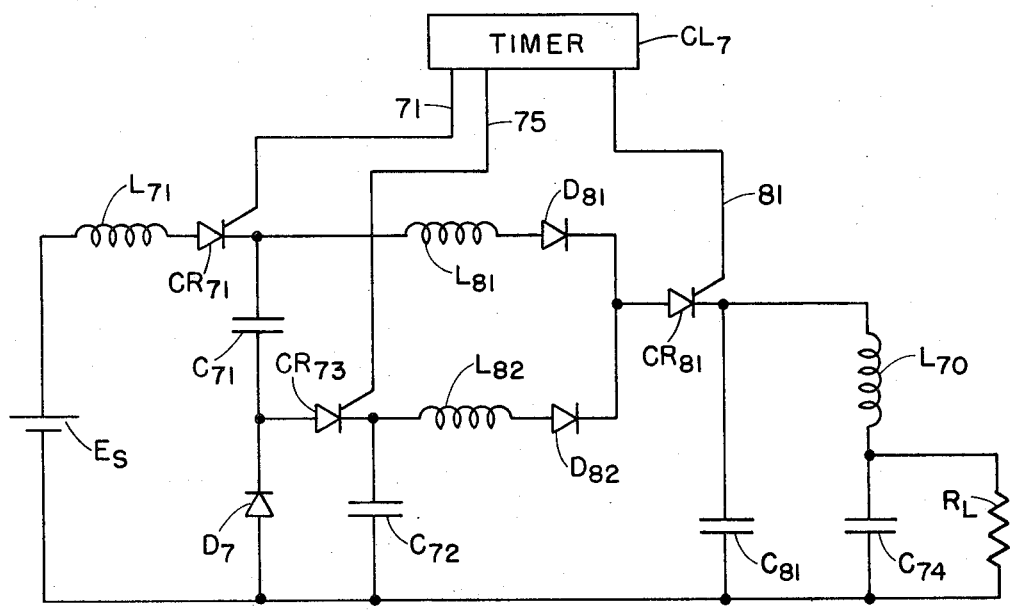
Figure 9:
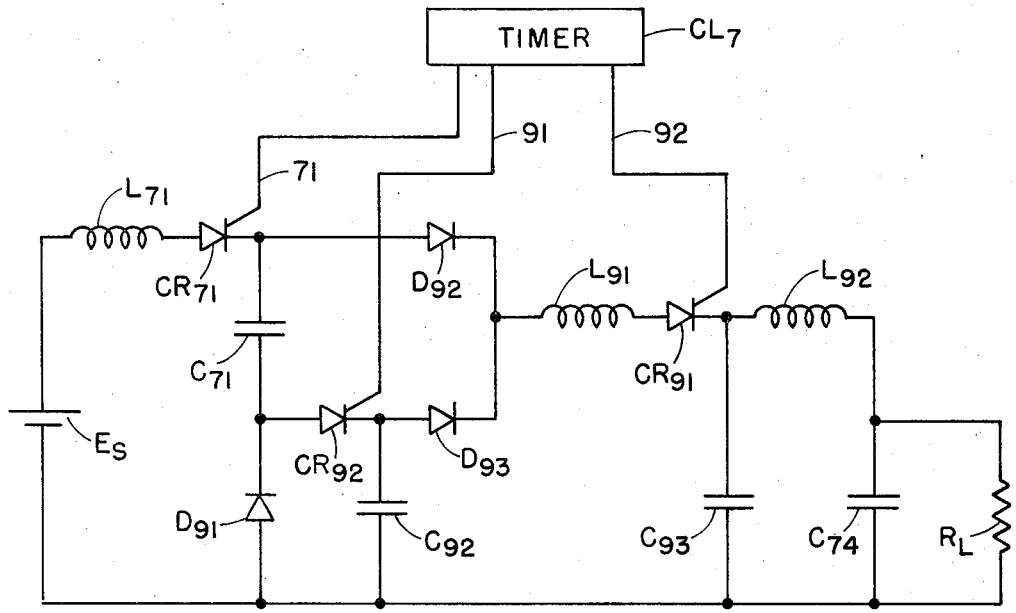
Figure 10:
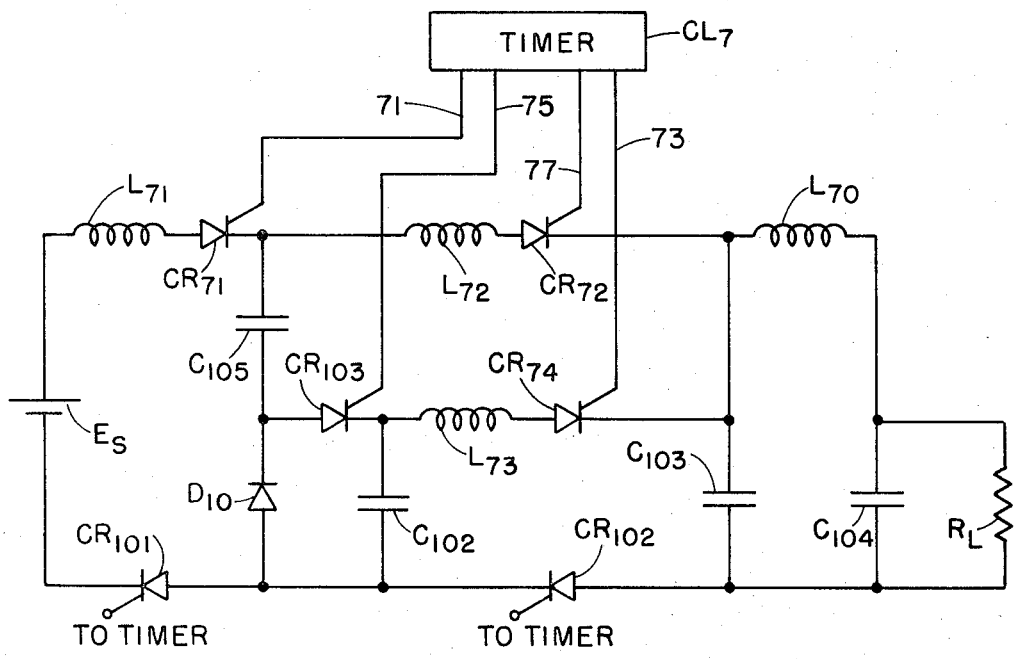
Figure 11:
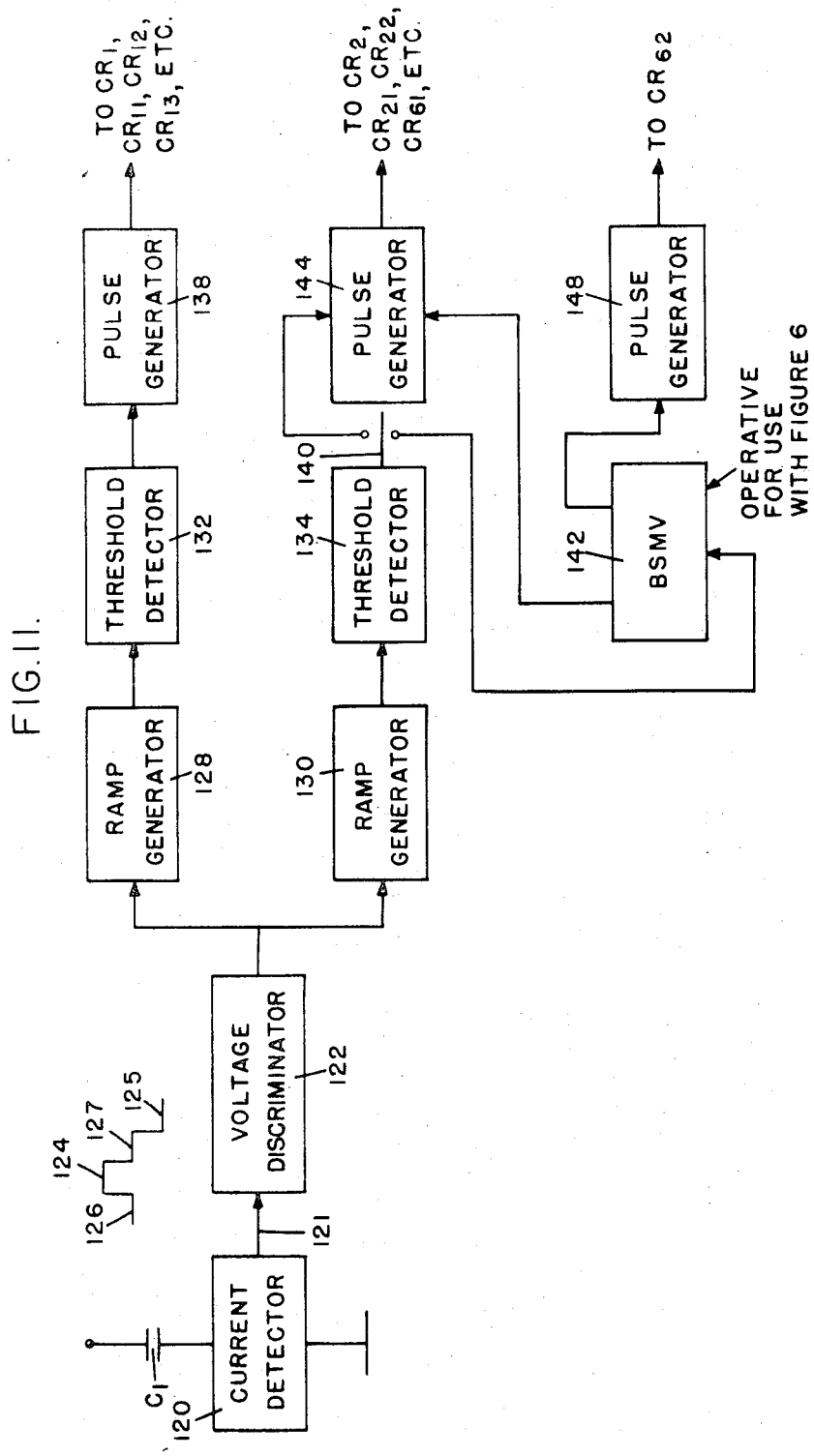

The FIGS. 2a, 2b, 2c, and 2d are waveform diagrams useful in explanation of the operation of the circuit of the FIG. 1;

The FIG. 3 is an equivalent circuit of a portion of the embodiment of the FIG. 1;

The FIG. 4 is an equivalent circuit of a further portion of the embodiment of the FIG. 1;

The FIG. 5 is a schematic diagram of a voltage step-up embodiment of the invention featuring voltage-doubling capacitors;

The FIG. 6 is a circuit diagram of a further embodiment of the invention involving voltage transformation by a transformer;

The FIG. 7 is a further embodiment of the invention and illustrating the manner in which voltage step-down is accomplished;

The FIG. 8 is another configuration of the invention featuring voltage step-down;

The FIG. 9 illustrates still another configuration of a voltage step-down embodiment;

The FIG. 10 illustrates a portion of still another embodiment to achieve voltage step-down; and, The FIG. 11 presents in block diagram form the control system for the converter which includes the timer and the current detector.

DESCRIPTION OF THE PREFERRED EMBODIMENTS

In the drawings, inductors, capacitors, diodes, silicon controlled rectifiers and resistors are designated by conventional symbols and by reference characters L, C, D, SCR, and R with various subscripts. In the specification and claims the reference characters for inductors, capacitors, and resistors may also be used as algebraic symbols to represent the inductance in henrys, the capacitance in farads, the resistance in ohms of the several parts. In each case the sense of the usage will be clear from the context.

Explanation of this circuit is simplified by the assumptions that (1) the period of natural resonance of the low pass filter section composed of elements $L_0$ and $C_0$ is long compared to the time $T_0$ between the periodic switch closures of the circuit, i.e., $T_0 << \pi \sqrt{L_0 C_0}$ such that $dI_0/dt \cong 0$ for $nT_0 < t < (n+1)T_0$, which is to say the load current $I_0$ is essentially constant from one switch closure to the next, and (2) the resistive components of the respective circuit elements are negligible. Both assumptions are justifiable in typical designs and analysis based on them is generally satisfactorily. The explanation is, furthermore, restricted to the steady state operation of this circuit under conditions of cyclic stability.

Solid-state switches, are contemplated which may be the silicon controlled rectifiers $CR_1$ and $CR_2$ as illustrated in the FIG. 1. These devices have an anode, $a$, a cathode, $c$, and a trigger gate electrode, $g$, (see the FIG. 5, $CR_{12}$). A timing circuit $CL_1$ provides pulses to cause the switches to assume their on state. The timer $CL_1$, as well as the timers of the other FIGURES, provides periodical cyclically alternating trigger pulses to their respective SCRs. Each of these SCRs turned on only if the companion switch has completed its conduction cycle and has furthermore, completed its opening process. These switches are turned off automatically when the current tends to reverse. Details of the timer and its operation will be hereinafter described.

With reference to the FIG. 1, a source of potential $E_s$ is shown having its negative terminal coupled to a common conductor and its positive terminal connected to one end of an inductor $L_1$. The other terminal of the inductor $L_1$ is coupled to the anode of a SCR $CR_1$. The cathode of $CR_1$ is connected to a capacitor $C_1$ and an inductor $L_2$. The gate electrode of $CR_1$ is coupled to a timer $CL_1$. The other end of the capacitor $C_1$ is connected to a current detector 120 whose output to the timer $CL_1$ on a conductor 121 will control the cyclic operation of the switches $CR_1$ and $CR_2$. The current detector 120 is then coupled to the common conductor.

The switch $CR_2$ is connected to the inductor $L_2$ while its cathode is connected to a capacitor $C_2$, a diode D, and an inductor $L_0$. The gate electrode of $CR_2$ is connected to the timer $CL_1$. A load indicated by $R_L$ is connected across from the common conductor to the other end of the inductor $L_0$. A capacitor $C_0$ is in parallel with the load $R_L$. The other terminals of the capacitor $C_2$ and the diode D connected to the common conductor.

The circuit configurations of the equivalent circuits of the FIGS. 3 and 4 will be discussed later with reference to the operation of the circuit of the FIG. 1.

In the FIG. 5, the source $E_s$ has its positive terminal connected to a pair of inductors $L_{11}$ and $L_{12}$. The inductors $L_{11}$ and $L_{12}$ are in parallel relationship and are connected also to the switches $CR_{11}$ and $CR_{12}$, respectively. The gate electrodes of $CR_{11}$ and $CR_{12}$ are connected to a timer $CL_5$ via a pair of conductors 50 and 51 while the cathode of $CR_{11}$ is connected to an inductor $L_2$. The cathode of $CR_{12}$ is connected to a capacitor $C_{12}$ and the anode of a switch $CR_{22}$. A capacitor $C_{11}$ and the anode of a switch $CR_{13}$ are connected in series, the other terminal of the capacitor $C_{11}$ being connected to the cathode of the switch $CR_{11}$ while the cathode of the switch $CR_{13}$ is connected to the common conductor. The cathode of the switch $CR_{22}$ is connected midway between the capacitor $C_{11}$ and the anode of the switch $CR_{13}$. The gate electrode of $CR_{13}$ is connected to the timer $CL_5$ via a conductor 52 so that it receives pulses at the same time as $CR_{11}$ and $CR_{12}$ through the conductors 50 and 51. The capacitor $C_{12}$ has its other terminal connected to a current detector 120 as in the FIG. 1.

The other terminal of the inductor $L_2$ is connected to the anode of a switch $CR_{21}$ whose cathode is connected to a capacitor $C_2$, a diode D, and an inductor $L_0$. The gate electrode of $CR_{21}$ is connected to the timer $CL_5$ via a conductor 53 and it receives pulses at the same time as the gate electrode of $CR_{22}$ via a conductor 54. The other terminals of the capacitor $C_2$, the diode D, and the capacitor $C_0$ are connected to the common terminal while the load $R_L$ is impressed in parallel across the capacitor $C_0$.

In the FIG. 6, an embodiment is illustrated wherein a transformer T is employed to provide circuit isolation or voltage or current step-up as desired. The source of $E_s$ has its positive terminal connected in series, respectively, with an inductor $L_1$ and the anode of $CR_1$. The gate electrode of $CR_1$ is coupled to a timer $CL_6$ via a conductor 61 while the cathode of $CR_1$ is connected in parallel with a capacitor $C_1$, winding $W_{11}$ and winding $W_{12}$ of the transformer T. The windings $W_{11}$ and $W_{12}$ form the primaries of the transformer T while a pair of windings $W_{23}$ and $W_{24}$ form secondaries. The switch $CR_{61}$ is connected to the other end of the winding $W_{11}$ and the common conductor while a switch $CR_{62}$ is connected to the other end of winding $W_{12}$ and the common conductor. The gate electrodes of the switches $CR_{61}$ and $CR_{62}$ are controlled by the timer $CL_6$ through a pair of conductors 63 and 65, respectively. A source of potential $E_{65}$ has its positive terminal at ground while its negative terminal is connected in parallel to a pair of resistors $R_{61}$ and $R_{62}$ which are then coupled, respectively, to the anodes of the switches $CR_{61}$ and $CR_{62}$.

The output windings $W_{23}$ and $W_{24}$ are connected to the common conductor while their other ends are coupled, respectively, to a pair of diodes $D_2$ and $D_1$. The cathodes of the diodes $D_1$ and $D_2$ are coupled together and to a capacitor $C_2$, a diode D, and an inductor $L_0$. A capacitor $C_0$ is in series between the inductor $L_0$ and the common terminal while the other terminals of the capacitor $C_2$ and the diode D are also connected to the common terminal. A load indicated by a resistor $R_L$ is in parallel relationship across the capacitor $C_0$. A current detector 120 is employed as in the other FIGURES.

The FIGS. 7, 8, 9, and 10 show the embodiments of the invention whereby voltage step-down is accomplished. The circuitry of the FIG. 7 is easiest described by stating that a source of potential $E_s$ has its negative terminal connected to the common conductor and the following elements are in series with the positive terminal of $E_s$: an inductor $L_{71}$, a switch $CR_{71}$, an inductor $L_{72}$, a switch $CR_{72}$, an inductor $L_{70}$ and a capacitor $C_{74}$. The other end of the capacitor $C_{74}$ is coupled to the common therminal while a load indicated by a resistor $R_L$ is impressed in parallel across this capacitor. A capacitor $C_{71}$ is connected mid point between $CR_{71}$ and the inductor $L_{72}$ and to a diode $D_7$, the anode of the diode $D_7$ being connected to the common conductor. From the point common to the capacitor $C_{71}$ and the diode $D_7$ are the series elements $CR_{73}$, an inductor $L_{73}$, $CR_{74}$, and a capacitor $C_{73}$. The other terminal of the capacitor $C_{73}$ is connected to a common conductor while its other terminal is also connected to the cathode of $CR_{72}$. A capacitor $C_{72}$ is connected between the common conductor and the point common to $CR_{73}$ and the inductor $L_{73}$. A pair of conductors 71 and 75 couple the timer $CL_7$ to the switches $CR_{71}$ and $CR_{73}$, respectively, while a pair of conductors 73 and 77 couple the timer $CL_7$ to the switches $CR_{74}$ and $CR_{72}$, respectively. The gate pulses are applied on the conductors 71 and 75 to the gate electrodes of $CR_{71}$ and $CR_{73}$ at the same time. Similarly, the gates of the switches $CR_{72}$ and $CR_{74}$ receive pulses at the same time via the conductors 73 and 77.

A further arrangement is illustrated in the FIG. 8 wherein an inductor $L_{81}$ and a diode $D_{81}$, in series, are coupled in parallel to similar elements $L_{82}$ and $D_{82}$ which are then both connected in series to a switch $CR_{81}$. The gate electrode of the switch $CR_{81}$ is coupled to the timer via a conductor 81 while the cathode electrode would be connected to charge a capacitor $C_{81}$.

Another configuration of a step-down embodiment is illustrated in the FIG. 9 wherein the anode of a diode $D_{91}$ is coupled to the common conductor while its cathode is connected through a capacitor $C_{91}$ to the anode of a diode $D_{92}$. In parallel with the diode $D_{91}$, the capacitor $C_{91}$ and the diode $D_{92}$, are series elements $C_{92}$ and $D_{92}$. The cathodes of the diodes $D_{92}$ and $D_{93}$ are connected together and to an inductor $L_{91}$. The other terminal of the inductor $L_{91}$ is connected to the anode of a switch $CR_{91}$. The cathode of $CR_{91}$ is connected to a capacitor $C_{93}$ and an inductor $L_{92}$. The other terminal of the inductor $L_{92}$ would be connected to a load circuit. The other end of the capacitor $C_{93}$ is connected to the common conductor. The switches $CR_{91}$ and $CR_{92}$ are controlled by a timer (not shown) on a pair of conductors 92 and 91, respectively.

In the FIG. 10, a portion of a circuit is illustrated that would be substituted, for example, for the lower portion of the circuit of the FIG. 5. As illustrated, the following elements are in parallel relationship: a source of potential $E_s$, a diode $D_{10}$, a capacitor $C_{102}$, a capacitor $C_{103}$, a capacitor $C_{104}$, and a load indicated by a resistor $R_L$. The lower ends of these elements are connected in common except that a switch $CR_{102}$ is connected between the capacitors $C_{102}$ and $C_{103}$ while a second switch $CR_{101}$ is connected between the source of potential $E_s$ and the diode $D_{10}$, as illustrated. The switches $CR_{101}$, $CR_{102}$, and $CR_{103}$ are controlled by a timer, not shown in the FIG. 10.

The switches CR of the present invention are controlled by the timer as previously set forth. The timer may take a number of different forms and the FIG. 11 is illustrative of a timer which may be employed in the practice of the invention. The timer normally will utilize a pair of output pulse bearing conductors as shown in the FIGS. 1 and 5; however, the embodiment of the FIG. 6 employes a three sequence operation so that three individual conductors 61, 63, and 65 emanate from the timer.

With reference to the FIG. 11, a current detector 120 is interposed at any convenient location such as between the capacitor $C_1$ and the common conductor as illustrated in the FIG. 1. The current detector 120 will detect the flow of current as illustrated in the FIGS. 2c and 2d. The output of the current detector 120 is directed via the conductor 121 to a voltage discriminator 122 which detects, as illustrated on the waveform above the discriminator 122, when its output voltage is at the point 124, 125, or at the point 126. If the voltage is at the point 126, it will commence operation of a ramp generator 128 and if the voltage is at the point 127, a ramp generator 130 will commence functioning.

The ramp generator 128 is insensitive to voltages at all other levels whereas the ramp generator 130 is insensitive to voltages at all other levels.

With continued reference to the FIG. 11, a threshold detector 132 is coupled to the output of the ramp generator 128 and, similarly, a threshold detector 134 is connected to receive the output of the ramp generator 130. The threshold detector 132 will detect the level of the ramp generator 128 which corresponds to the time between the point 136 of the FIG. 2c and the commencement of the next pulse at $T_0$ shown in the FIG. 2d. The time lapse between the point 136 and $T_0$ may be adjustable by the setting of the threshold detection level. After the threshold detector 132 has detected the threshold signal of the ramp generator 128, a pulse from a pulse generator 138 is transmitted to $CR_1$ of the FIG. 1 or $CR_{11}$, $CR_{12}$, and $CR_{13}$, or other CR's, all of which may be termed the first group of switches.

The output of the threshold detector 134 of the FIG. 11 is coupled to a previously set single-pole double-throw switch 140 so that in the operation of a circuit similar to that of the FIG. 6, the switch 140 would be in its lower position so that the output of the threshold detector 134 is directed to a bistable multivibrator 142. For other embodiments shown in the FIGS. the switch 140 would be set in its upper position so that the output of the threshold detector 134 would be coupled only to a pulse generator 144, which is similar to the pulse generator 138. The output of the pulse generator is directed to what may be termed the second group of CR's such as $CR_2$, or $CR_{21}$ and $CR_{22}$ or $CR_{61}$.

It will be noted from the FIG. 6, that the timer $CL_6$ is required to provide a sequence of three pulses on the conductors 61, 63, and 65 whereas the other circuits require only a sequence of two pulses. As noted earlier, during the operation of the circuit of the FIG. 6, the switch 140 would be in its lower position so that the bistable multivibrator 142 would alternately supply signals to the pulse generator 144 and a pulse generator 148. During the operation of this circuit, the sequence would be as follows:

the pulse generator 138 would first pulse $CR_1$ on the conductor 61; the pulse generator 144 would next pulse $CR_{61}$ on the conductor 63; the pulse generator 138 would again pulse $CR_1$ on the conductor 61; and, the pulse generator 148 would then pulse $CR_{62}$ on the conductor 65. Thereafter, the cycle repeats.

With reference to the FIG. 1, and starting at time $t = 0^-$, when both $CR_1$ and $CR_2$ are open and $CR_2$ is about to close, $i_1(0) = i_2(0) = 0$ and the capacitors $C_1$ and $C_2$ are charged to potentials of $v_1(0)$ and $v_2(0)$ respectively. The output voltage $e_0$ of the circuit is impressed across the load $R_L$. The current $I_0$ flows in the inductor $L_0$. The controlled rectifier or switch $CR_2$ closes at time $t = 0^+$. The current $i_2$ that flows after closure of $CR_2$ may be calculated with reference to the simplified equivalent circuit depicted in the FIG. 3; and, the corresponding waveform is illustrated in the FIG. 2d. The voltage equilibrium in this circuit is given by the relation:

$$v_1(t) = L(di_2/dt) + v_2(t) \quad (1)$$

or $$v_1(0) - \frac{1}{C_1}\int_0^t i_2 dt = L\frac{di_2}{dt} + v_2(0) + \frac{1}{C_2}\int_0^t (i_2 - I_0) dt \quad (2)$$

Solution of the differential equation (2) leads to:

$$i_2(t) = \sqrt{C/L_2}\, \Delta v \sin \omega_0 t + I_0 (C/C_2)(1 - \cos \omega_0 t) \quad (3)$$

where $C$ is defined as $C \triangleq (C_1 C_2/C_1 + C_2)$
$\Delta v$ is defined as $\Delta v \triangleq v_1(0) - v_2(0)$
and $\omega_0$ is defined as $\omega_0 \triangleq 1/\sqrt{L_2 C}$
and using the initial conditions $i_2(0) = 0$ $$L(di_2(0)/dt) = v_1(0) - v_2(0)$$

The voltage $v_2$ during the time interval $0 \leq t \leq (\pi/\omega_0)$ is now readily derived from the relation:

$$v_2(t) = v_2(0) + \frac{1}{C_2}\int_0^t (i_2 - I_0) dt \quad (2a)$$

as $$v_2(t) = v_2(0) + \frac{C}{C_2}[1 - \cos \omega_0 t]\Delta v - I_0 \left[\frac{C}{C_2^2 \omega_0}\sin \omega_0 t + \frac{t}{C_1 + C_2}\right] \quad (4)$$

At $t = \pi/\omega_0$, $v_2(t)$ reaches a maximum given by $$v_2(\pi/\omega_0) = v_2(0) + 2(C/C_2)\Delta v - (I_0/C_1 + C_2)(\pi/\omega_0) \quad (5)$$

Current $i_2(t)$ subsides at $t = \pi/\omega_0$ and the current through the switch $CR_2$ tends to reverse so that the controlled rectifier $CR_2$ is opened, but capacitor $C_2$ continues to be discharged by the current source $-I_0$ which represents the "constant" current in inductor $L_0$. The voltage $v_2(t)$ then declines linearly during the remaining time interval $\pi/\omega_0 < t < T_0$ before $CR_2$ recloses thus:

$$v_2(t) = v_2(\pi/\omega_0) - (I_0/C_2)(t - \pi/\omega_0) \quad (6)$$

and under condition of cyclic stability, $$v_2(T_0) = v_2(\pi/\omega_0) - (I_0/C_2)(T_0 - \pi/\omega_0). \quad (6a)$$

The DC voltage $e_0$ that appears at the output terminals of the output filter corresponds to the time average $v_{2av}$ of $v_2(t)$, i.e., $$e_0 = \frac{1}{T_0}\int_0^{T_0} v_2(t) dt = v_{2av} \quad (7)$$

After integration of $v_2(t)$ as expressed by relation (4) and using its values at $t = \pi/\omega_0$ and $t = T_0$ respectively, it is construed that $$v_{2av} = \frac{1}{T_0}\left\{\int_0^{\pi/\omega_0} v_2(t) dt + \frac{1}{2}[v_2(\pi/\omega_0) + v_2(0)]\left[T_0 - \frac{\pi}{\omega_0}\right]\right\} \quad (8)$$

making use of the formerly introduced assumption that $I_0$ remains invarient. After working out relation (8) it is found that:

$$\int_0^{\pi/\omega_0} v_2(t) dt = \frac{\pi}{\omega_0}\left[v_2(0) + \frac{C}{C_2}\Delta v\right] - 2\frac{CI_0}{C_2^2 \omega_0^2} - \frac{1}{2}\frac{I_0}{C_1 + C_2}\left(\frac{\pi}{\omega_0}\right)^2 \quad (8a)$$

and then that $$v_{2av} = (1/T_0) \{ (\pi/\omega_0) [v_2(0) + (C/C_2) \Delta v - \tfrac{1}{2}(I_0/C_1+C_2) \pi/\omega_0] - 2(CI_0/C_2^2\omega_0^2)$$
$$+ \tfrac{1}{2} [2v_2(0) + 2(C/C_2) \Delta v - (I_0/C_1+C_2) (\pi/\omega_0)][T_0 - \pi/\omega_0]\}$$

(8b)

Regrouping terms leads to:

$$v_{2av} = v_2(0) + (C/C_2) \Delta v - \tfrac{1}{2}(I_0/C_1+C_2) \pi/\omega_0 - 2(I_0/T_0)(C/C_2)^2 L_2$$

(8c)

The waveform of $v_2(t)$ is depicted in FIG. 2b and $v_{2av}$ is the average value of that curve. So far it has been tacitly assumed that $v_2(t)$ returns after every completed cycle to $v_2(0)$ and finds a voltage of $v_1(0)$ on capacitor $C_1$ whenever the charge on $C_2$ should be replenished.

Consider the variations in capacitor voltage $v_1(t)$. It is assumed that at time $t=0$, $v_1 = v_1(0)$. Then:

$$v_1(t) = v_1(0) - \frac{1}{C_1}\int_0^t i_2(t)dt \quad (9)$$

and at time $t = \pi/\omega_0$, $$v_1(\pi/\omega_0) = v_1(0) - 2(C/C_1) \Delta v - I_0 (C/C_2) (\pi/\omega_0)$$

(10)

This potential $v_1$ remains constant—after opening of $CR_2$—until $CR_1$ closes and current $i_1$ starts to flow. The character of the current $i_1$ is that of a sinusoid as depicted in FIG. 2c. Voltage $v_1(t)$ at time $t = \pi/\omega_{01} - kT_0$ is readily calculated as:

$$v_1[\pi/\omega_{01} - kT_0] = 2E - v_1(\pi/\omega_{01}) = v_1(0)$$

(11)

where $$\omega_{01} \triangleq 1/\sqrt{L_1C_1}$$
$$1 - k < (T_0 - \pi/\omega_{01}/T_0)$$

An equivalent circuit for the path of $i_1$ is depicted in FIG. 4. Switch $CR_1$ closes at time $t = kT_0$. Relations (10) and (11) are solved for:

$$E_s = v_1(0) - (C/C_1) \Delta V - \tfrac{1}{2}(I_0C_1+C_2) \pi/\omega_0$$

(12)

or $$E_s = (C_1/C_1+C_2) v_1(0) + (C_2/C_1+C_2) v_2(0) - \tfrac{1}{2}(I_0/C_1+C_2) \pi/\omega_0$$

(12a)

Relation 8c is rewritten as:

$$v_{2av} = (C_1/C_1+C_2) v_1(0) + (C_2/C_1+C_2) v_2(0) - \tfrac{1}{2}(I_0/C_1+C_2) \pi/\omega_0 - 2(I_0/T_0)(C/C_2)^2 L_2$$

(8d)

A measure for the deviation of $e_{oav}$ from $E_s$ is gained by forming the ratio $$(E_s - e_{av}/E_s) = 2 (I_0/E_s) (L_2/T_0) (C/C_2)^2$$

(13)

It is noted that:
$C < C_2$ since $C$ is a series combination of $C_1$ and $C_2$
$2L_2 < T_0$ since $\pi/\omega_0 < T_0$ with $\sqrt{L_2C_2} = 1/\omega_0$ and where
$0.1 \lesssim (L_2/C) \lesssim 10$
If, furthermore, $|I_0| << E_s$ as commonly found with systems employing triggered devices, for the purposes of a minimization of the forward voltage drop, then $$2 (I_0L_2/E_sT_0) (C/C_2)^2 << 1$$

(14)

and becomes a negligible quantity when compared to the output voltage reduction due to regulation losses. This shows that $$e_{oav} = E_s$$

(15)

as long as $I_0 << E_s$, which concludes the proof that the series capacitor DC transformer is ideally load insensitive, as long as the stipulated restrictions are observed.

Figure 2:
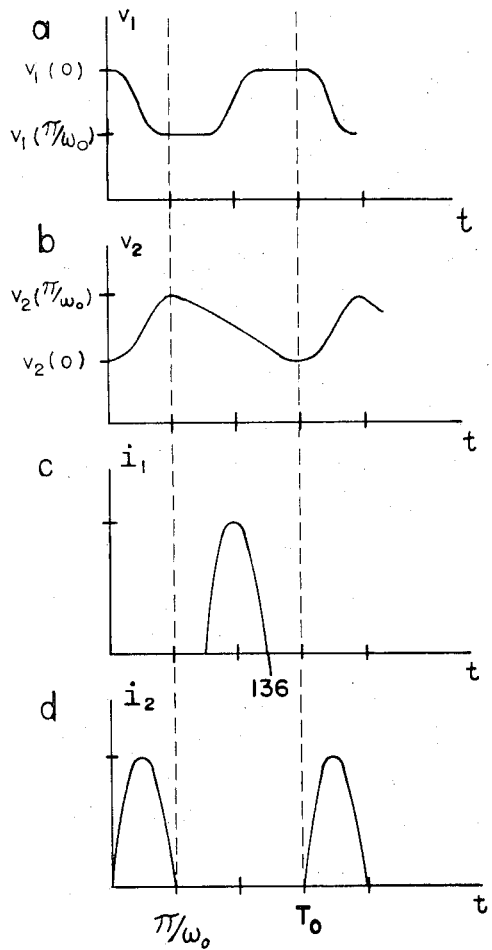

The simple illustrative form of the network illustrated in the FIG. 1 and the explanatory drawings of the FIGS. 2, 3, and 4 will not find general utility since the source of electrical energy (the battery) itself provides a similar degree of load insensitivity. However, the principles which have been applied and the analysis as just developed may be applied equally well to the more complex circuits shown in the remaining FIGURES.

Reference will now be had to the step-up embodiment shown in the FIG. 5. A pulse from the timer $CL_5$ to the switches $CR_{11}$, $CR_{12}$, and $CR_{13}$ will permit current flow through the inductors $L_{11}$ and $L_{12}$ so that the pair of capacitors $C_{11}$ and $C_{12}$ are charged in parallel. By the surge charging method as described, the capacitors $C_{11}$ and $C_{12}$ are charged to peak potentials greater than the potential of $E_s$ by an amount proportional to the load $R_L$. The relative location of these capacitances within the basic scheme as described above is changed after the switches $CR_{11}$, $CR_{12}$, and $CR_{13}$ open at the end of the charging cycle whereupon the capacitors $C_{11}$ and $C_{12}$ are now coupled in series by a pulse from the timer $CL_5$ which causes the closure of the switch $CR_{22}$ (and the switch $CR_{21}$) and then discharged through the inductor $L_2$ and the now closed switch $CR_{21}$ to charge the capacitor $C_2$ so that it will ascertain an average voltage of $2E_s$. A so called "free wheeling" diode D parallels the capacitor $C_2$ to prevent a negative polarity of the capacitor $C_2$ under transient conditions. The function of the inductor $L_0$ and the capacitor $C_0$ is to act as a filtering network for the load $R_L$ so that a more constant output to the load is maintained. Subsequently, the cycle repeats through the action of the current detector 120 and with the timer $CL_5$ initiating subsequent pulses so that voltage across the load $R_1$ remains constant.

By similar circuits involving more than two capacitors charged in parallel, the voltage may be stepped up by any desired multiple (less than one, one, or more than one). Similarly, current may be stepped up, and voltages stepped down, by charging capacitors in series and discharging them in parallel. For these circuits, attention is directed to the remaining FIGURES to be hereinafter described. In addition, input-output isolation may be achieved similarly by appropriate additional switching elements, also to be hereinafter described. An advantage of these capacitor arrangements is the elimination of a wire-wound transformer at the mere expense of one additional forward voltage drop in one solid-state switch (CR) per stage of voltage level change.

The arrangement of the FIG. 5 is deemed the preferred embodiment of the invention in the sense that some number of capacitors for voltage or current multiplication ordinarily will be selected, and an appropriate number of stages chosen as the design requirements for a particular use may require.

The FIG. 6 is a diagram of an embodiment of the invention wherein a transformer T is employed to provide circuit isolation or voltage for current step-up as desired. For more effective use of the iron core, a push-pull arrangement is preferred, as shown. The transformer T includes a pair of primary windings $W_{11}$ and $W_{12}$ and a pair of secondary windings $W_{23}$ and $W_{24}$. The primary windings $W_{11}$ and $W_{12}$ are arranged with their turns opposed as conventionally indicated by the dots and are connected to discharge the capacitor $C_1$ alternately through the switches $CR_{61}$ or $CR_{62}$. A pair of resistors $R_{61}$ and $R_{62}$ are coupled to a potential source $E_{65}$ and the anodes, respectively, of $CR_{61}$ and $CR_{62}$ to assist the turn-off of their respective switch by balancing out the small magnetizing current.

The operation of the circuit of the FIG. 6 is again discussed after establishment of steady state conditions. All CR switches are operated from its respective timer circuit (see the FIG. 11) which is programmed to suit the following discussion.

Switch $CR_1$ is turned on by a pulse on a conductor 61 from the timer $CL_6$, current will flow into the capacitor $C_1$ charging it to its peak value. Subsequently, the switch $CR_1$ opens and after the expiration of a time period as determined in the current detector 120 (and the ramp generators and the threshold detectors of the FIG. 11), a pulse appears on a conductor 63 from the timer $CL_6$ to turn on the switch $CR_{61}$ which results in connecting the charged capacitor $C_1$ through the winding $W_{11}$. The resulting surge of primary current induces a voltage in the secondary windings $W_{23}$ and $W_{24}$. Also a current now flows through the diode $D_1$ to allow the recharge of the capacitor $C_2$. The switch $CR_{61}$ opens and next, a pulse on the conductor 61 would again close $CR_1$ so that the capacitor $C_1$ is again recharged. Thereafter, a pulse on the conductor 65 from the timer $CL_6$ to the switch $CR_{62}$ would induce a flux change so that current flows in the secondary winding $W_{23}$, the rectifier $D_2$ and to charge the capacitor $C_2$. As previously set forth, the sequence of pulses from the timer $CL_6$ would be on the conductor 61, the conductor 63, the conductor 61, and the conductor 65. Thereafter, the cycle repeats. During the sequence of charging and discharging the capacitor $C_1$ and the opening and closing of the switches, the capacitor $C_2$ is available to supply current to the load $R_1$ at a constant voltage.

The FIGS. 7, 8, 9, and 10 illustrate further embodiments and ramifications of the invention. For example, in the circuit of the FIG. 7, a pulse on the conductors 71 and 75 to $CR_{71}$ and $CR_{73}$ will cause the capacitors $C_{71}$ and $C_{72}$ to be charged in series. Thereafter, a subsequent pulse on conductors 73 and 77 from the timer $CL_7$ to the switches $CR_{72}$ and $CR_{74}$ will discharge the capacitors $C_{71}$ and $C_{72}$ in parallel through inductors $L_{72}$ and $L_{73}$, respectively, into the capacitor $C_{73}$. As illustrated, the capacitor $C_{73}$ is available to supply a constant multiple of voltage $E_s$ to the load indicated as a resistor $R_L$.

The schematic of the FIG. 8 illustrates the discharge circuit of another embodiment. Wherein the switches $CR_{72}$ and $CRhd 74$ of the FIG. 7 are replaced by a pair of diodes, respectively, $D_{81}$ and $D_{82}$ so that upon the receipt of an initiating pulse on a conductor 81 from a timer to the switch $CR_{81}$, the load supply capacitor $C_{81}$ will be charged.

The embodiment of the FIG. 9, illustrates a circuit for charging a pair of capacitors in series and discharging these capacitors in parallel. More specifically, a pulse on a conductor 91 to a switch $CR_{92}$ would turn on $CR_{92}$ so that the incoming current flow would be to the capacitor $C_{91}$ and through the switch $CR_{92}$ to a capacitor $C_{92}$. After the switch $CR_{92}$ opens, a pulse on a conductor 92 from the timer would close the switch $CR_{91}$ so that the capacitor $C_{91}$ discharges through a diode $D_{92}$ and the capacitor $C_2$ discharges through a diode $D_{93}$. The current flow through an inductor $L_{91}$ will charge the load capacitor $C_{93}$.

The FIG. 10 demonstrates the feasibility of DC isolation which may be desirable in the event that a common ground would not be used. Initially, the capacitors, $C_{105}$ and $C_{102}$ would be charged in series similar to the function of the circuit in the FIG. 9 by a pulse on a conductor 103 to turn on the switch $CR_{103}$. The capacitors $C_{103}$ and $C_{105}$ would be charged to the reference level of the source $E_s$. Next, the switches $CR_{101}$ and $CR_{103}$ are pulsed together (as well as other switches above the dotted line and not shown). Then, the capacitor $C_{105}$ and the capacitor $C_{102}$ discharge by a pulse to the switch $CR_{102}$ (which would also be applied to a switch not shown and above the dotted line) so that the capacitors $C_{103}$ and $C_{104}$ are charged to the reference level of the load indicated symbolically as a resistive load at $CR_1$.

The foregoing analysis and discussion is general and linear. The circuits of the present invention are operable over wide ranges of parameter values. The choice of the particular values depends upon the function to be performed. If reduction in weight is of primary concern, a relatively high operating frequency is selected which minimizes the size and weight of the inductors and the capacitors.

It will thus be seen that the objects set forth above, among those made apparent from the preceeding description, are efficiently attained and since certain changes may be made in the above instructions without departing from the scope of the invention it is intended that all matter contained or shown in the accompanying drawings have been interpreted as illustrative and not as limiting.

The invention relates to switching circuits in which capacitors are being respectively charged in series and/or parallel combinations from a source of electrical energy in a pulsating manner, whereby the current is limited by insertion of an inductor in the path of the charging thus forming a resonant impedance in conjunction with the capacitors and causing resonant current turned-off in the unidirectional control and/or uncontrolled switching devices. The capacitors discharge in turn continuously into a load.

It is also to be understood that the following claims are intended to cover all the generic and specific features of the invention herein described and all statements of the scope of the invention which, as a matter of language, may be said to fall therebetween.

What is claimed is:

1. Apparatus for maintaining a selected potential across a load which may differ from the potential of a source comprising: first and second inductive impedance means; first and second capacitive means; filter means terminated in a load; means for selectively charging said first capacitive means through said first inductive means; and, means for selectively discharging said first capacitive means through said second inductive means to said second capacitive means, said filter means and said load.

2. Apparatus for maintaining a selected potential across a load which may differ from the potential of a source comprising: first and second inductive impedance means; first and second capacitive means; filter means terminated in a 'oad; means including silicon controlled rectifiers for selectively charging said first capacitive means through said first inductive means; means including further silicon controlled rectifiers for selectively discharging said first capacitive means through said second inductive means to said second capacitive means, said filter means and said load; and, timing means for controlling the operation of said silicon controlled rectifiers and said further silicon controlled rectifiers.

3. An energy transmission circuit as defined by claim 10 wherein said timing means operate in a repetitive cycle having a period $T_0$.

4. An energy transmission system as defined by claim 3 wherein said filter means includes an inductor connected in series relationship to said load and an output capacitor connected across said load having a capacitance $C_0$ and wherein the product of said capacitance in farads, multiplied by the inductance $L_0$ in henrys of said output inductor is much greater than the square $T_0^2$ of said period in seconds.

5. A power converter for supplying power from a source of power to a load comprising:
a first inductive impedance;
a first switch;
a first voltage storage means for storing current, said first inductive impedance, said first switch and said first voltage storage means being connected in series with said source of power;
a second inductive impedance;
a second switch;
a second voltage storage means for storing current, said second inductive impedance, said second switch and said second voltage storage means being connected in series, said series connection being connected in parallel with said first voltage storage means, said load being connected in parallel with said second voltage storage means;
a third switch, said third switch being connected in series with said first inductive impedance, said first switch and said first voltage storage means;
a fourth switch;
a fifth switch;
a third inductive impedance, said fourth switch, said fifth switch and said third inductive impedance being connected in series, said series connection being connected in parallel with said series connected first switch, said first inductive impedance and said first voltage storage means; and,
a third voltage storage means for storing current, said third voltage storage means being connected in parallel with said series connected third and fifth switches.

6. A power converter as claimed in claim 5 including:
a current detector connected in series with said third voltage storage means; and
a timer circuit connected to said current detector circuit and to said first, second, third, fourth and fifth switches for sequentially enabling said switches in a predetermined manner to allow said switches to pass current.

7. A power converter as claimed in claim 6 wherein:
said first, second, third, fourth and fifth switches are first, second, third, fourth and fifth silicon controlled rectifiers, the gates of said silicon controlled rectifiers being connected to said timer circuit; and
said first, second and third voltage storage means are first, second and third capacitors.

8. A power converter as claimed in claim 6 including:
a LC filter circuit connected between said second capacitor and said load, the inductor of said LC filter circuit being connected in series with said load and the capacitor of said LC filter circuit being connected in parallel with said load; and
a diode connected in parallel with said second capacitor.

9. A power converter for supplying power from a source of power to a load comprising:
a first inductive impedance;
a first switch;
a first voltage storage means for storing current, said first inductive impedance, said first switch and said first voltage storage means being connected in series with said source of power in the order named;
a second inductive impedance;
a second switch;
a second voltage storage means for storing current, said second inductive impedance, said second switch and said second voltage storage means being connected in series, said series connection being connected in parallel with said first voltage storage means, said load being connected in parallel with said second voltage storage means;
a diode, said diode being connected in series with said first inductive impedance, said first switch and said first voltage storage means;
a third switch;
a third voltage storage means for storing current, said third switch and said third voltage storage means being connected in series, said series connection being connected in parallel with said diode;
a third inductive impedance; and
a fourth switch, said third inductive impedance and said fourth switch connected in series from the junction between said third switch and said third voltage storage means to the junction between said second switch and said second voltage storage means.

10. A power converter as claimed in claim 9 including a timer circuit connected to said first, second, third and fourth switches in a predetermined manner to allow said first, second, third and fourth switches to pass current.

11. A power converter as claimed in claim 10 wherein:
said first, second, third and fourth switches are first, second, third and fourth silicon controlled rectifiers, the gates of said first, second, third and fourth silicon controlled rectifiers being connected to said timer circuit; and
said first, second and third voltage storage means are first, second and third capacitors.

12. A power converter as claimed in claim 10 including:
a LC filter circuit connected between said second capacitor and said load, the inductor of said LC filter circuit being connected in series with said load and the capacitor of said LC filter circuit being connected in parallel with said load.

13. A power converter as claimed in claim 12 including:
a fifth silicon controlled rectifier connected in series between said source of power and said diode and having its gate connected to said timer; and
a sixth silicon controlled rectifier connected in series between said second and third capacitors and having its gate connected to said timer.

14. A power converter for supplying power from a source of power to a load comprising:
a first inductive impedance;
a first switch;
a first voltage storage means for storing current, said first inductive impedance, said first switch and said first voltage storage means being connected in series with said source of power;
a second inductive impedance;
a second switch;
a second voltage storage means for storing current, said second inductive impedance, said second switch and said second voltage storage means being connected in series, said series connection being connected in parallel with said first voltage storage means, said load being connected in parallel with said second voltage storage means;
a first diode, said diode being connected in series with said first inductive impedance, said first switch and said first voltage storage means;
a second diode, said second diode being connected in series with said second inductive impedance, said second switch and said second voltage storage means;
a third switch;
a third voltage storage means for storing current, said third switch and said third voltage storage means being connected in series, said series connection being connected in parallel with said first diode;
a third inductive impedance; and
a third diode, said third inductive impedance and said third diode connnected in series from the junction between said third switch and said third voltage storage means to the junction between said second switch and said second diode.

15. A power converter as claimed in claim 14 including a timer circuit connected to said first, second, and third switches for sequentially enabling said first, second and third switches in a predetermined manner to allow said first, second and third switches to pass current.

16. A power converter as claimed in claim 15 wherein:
said first, second and third switches are first, second and third silicon controlled rectifiers, the gates of said first, second and third silicon controlled rectifiers being connected to said timer circuit; and,
said first, second and third voltage storage means are first, second and third capacitors.

17. A power converter as claimed in claim 16 including:
a LC filter circuit connected between said second capacitor and said load, the inductor of said LC filter circuit being connected in series with said load and the capacitor of said LC filter circuit being connected in parallel with said load.

18. A power converter as claimed in claim 17 including:
a fourth silicon controlled rectifier connected in series between said source of power and said first diode and having its gate connected to said timer; and
a fifth silicon controlled rectifier connected in series between said second and third capacitors and having its gate connected to said timer.

19. A power converter for supplying power from a source of power to a load comprising:
a first inductive impedance;
a first switch;
a first voltage storage means for storing current, said first inductive impedance, said first switch and said first voltage storage means being connected in series with said source of power;
a second inductive impedance;
a second switch;
a second voltage storage means for storing current, said second inductive impedance, said second switch and said second voltage storage means being connected in series, said series connection being connected in parallel with said first voltage storage means, said load being connected in parallel with said second voltage storage means;
a first diode, said first diode being connected in series with said first inductive impedance, said first switch and said first voltage storage means;
a second diode, said second diode being connected in series with said second inductive impedance, said second switch and said second voltage storage means;
a third switch;
a third voltage storage means for storing current, said third switch and said third voltage storage means being connected in series, said series connection being connected in parallel with said first diode; and
a third diode, said third diode connected from the junction between said third switch and said third voltage storage means to the junction between said second diode and said second inductive impedance.

20. A power converter as claimed in claim 19 including:
a timer circuit connected to said first, second and third switches for sequentially enabling said first, second and third switches in a predetermined manner to allow said first, second and third switches to pass current.

21. A power converter as claimed in claim 20 wherein:
said first, second and third switches are first, second and third silicon controlled recitifiers, the gates of said first, second and third silicon controlled rectifiers being connected to said timer circuit; and,
said first, second and third voltage storage means are first and second capacitors.

22. A power converter as claimed in claim 21 including:
a LC filter circuit connected between said second capacitor and said load, the inductor of said LC filter circuit being connected in series with said load and the capacitor of said LC filter circuit being connected in parallel with said load.

23. A power converter as claimed in claim 22 including:
a fourth silicon controlled rectifier connected in series between said source of power and said first diode and having its gate connected to said timer; and,
a fifth silicon controlled rectifier connected in series between said second and third capacitors and having its gate connected to said timer.

\* \* \* \* \*